United States Patent
Chang et al.

(10) Patent No.: US 6,741,655 B1
(45) Date of Patent: May 25, 2004

(54) ALGORITHMS AND SYSTEM FOR OBJECT-ORIENTED CONTENT-BASED VIDEO SEARCH

(75) Inventors: Shih-Fu Chang, New York, NY (US); William Chen, New York, NY (US); Horace J. Meng, New York, NY (US); Hari Sundaram, New York, NY (US); Di Zhong, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 0 days.

(21) Appl. No.: 09/423,409

(22) PCT Filed: May 5, 1998

(86) PCT No.: PCT/US98/09124

§ 371 (c)(1),
(2), (4) Date: Feb. 22, 2000

(87) PCT Pub. No.: WO98/50869

PCT Pub. Date: Nov. 12, 1998

Related U.S. Application Data

(60) Provisional application No. 60/045,637, filed on May 5, 1997.

(51) Int. Cl.⁷ .................................................. H04N 7/18
(52) U.S. Cl. ........................ 375/240.26; 375/240.08
(58) Field of Search ... 348/10–17; 375/240.01–240.29; 382/230–233; 707/1–4

(56) References Cited

U.S. PATENT DOCUMENTS

| | | | |
|---|---|---|---|
| 4,649,380 A | | 3/1987 | Penna |
| 5,606,655 A | | 2/1997 | Arman et al. |
| 5,655,117 A | | 8/1997 | Goldberg et al. |
| 5,734,893 A | * | 3/1998 | Li et al. .......................... 707/4 |
| 5,873,080 A | * | 2/1999 | Coden et al. ................... 707/3 |
| 5,930,783 A | * | 7/1999 | Li et al. .......................... 707/1 |
| 6,115,717 A | * | 9/2000 | Mehrotra et al. ........... 707/102 |

OTHER PUBLICATIONS

"Vision: A Digital Library"; Wei Li, Susan Gauch, John Gauch and Kok Meng Pua; Telecommunications and Information Sciences Laboratory (TISL); Dept. of Electrical Engineering and Computer Science, The University of Kansas, pp. 19–27.

(List continued on next page.)

*Primary Examiner*—Andy Rao
(74) *Attorney, Agent, or Firm*—Baker & Botts L.L.P.

(57) ABSTRACT

Object-oriented methods and systems for permitting a user to locate one or more video objects from one or more video clips over an interactive network are disclosed. The system includes one or more server computers (110) comprising storage (111) for video clips and databases of video object attributes, a communications network (120), and a client computer (130). The client computer contains a query interface to specify video object attribute information, including motion trajectory information (134), a browser interface to browse through stored video object attributes within the server computers, and an interactive video player.

10 Claims, 6 Drawing Sheets

OTHER PUBLICATIONS

"Motion Recovery for Video Content Classification", Dimitrova and Forouzan Golshani, Arizona State University, Tempe; ACM Transactions on Information Systems,pp. 408–439; Oct. 13, 1995; No. 4, New York, NY, U.S.A.

Chang, S.–F. et al. VideoQ: An Automated Content–Based Video Search System Using Visual Cues. Proceedings ACM Multimedia 97, Seattle, WA, Nov. 9–13, 1997, pp. 313–324U.S. Patent no 5,566,089 granted Oct. 15, 1996 to Hoogenboom.

Chang, S.–F. Content–Based Indexing and Retrival of Visual Information. IEEE Signal Processing Magazine. Jul. 1997, vol. 14, No. 4, pp. 45–48.

Li, W. et al. Vision: A Digital Video Library, Proceedings of the 1stACM International Conference on Digital Libraries, Bethesda, MD, Mar. 20–23, 1996. Pp. 19–27.

Gong Y. et al. A Generic Video Parsing System with a Scene Description Language (SDL). Real–Time Imaging, Feb. 1996, vol. 2, No. 1, pp. 45–59.

Russ, John C. The Image Processing Handbook. Boca Raton, Florida: CRC Press. 1995, 2nd ed., pp. 361–376.

* cited by examiner

ALGORITHMS AND SYSTEM FOR OBJECT-ORIENTED CONTENT-BASED VIDEO SEARCH

CROSS-REFERENCE TO RELATED APPLICATION

This application is related to U.S. Provisional Application No. 60/045,637, filed May 5, 1997, from which priority is claimed.

BACKGROUND OF THE INVENTION

1. Field of the Invention

This invention relates to techniques for searching and retrieving visual information, and, more particularly to the use of content-based search queries to search for and retrieve moving visual information.

2. Description of Related Art

During the past several years, as the Internet has reached maturity and multimedia applications have come into wide spread use, the stock of readily available digital video information has become ever increasing. In order to reduce bandwidth requirements to manageable levels, such video information is generally stored in the digital environment the form of compressed bitstreams that are in a standard format, e.g., JPEG, Motion JPEG, MPEG-1, MPEG-2, MPEG-4, H.261 or H.263. At the present time, hundreds of thousands of different still and motion images, representing everything from oceans and mountains to skiing and baseball, are available over the Internet.

With the increasing wealth of video information available in a digital format, a need to meaningfully organize and search through such information has become pressing. Specifically, users are increasingly demanding a content based video search engine that is able to search for and retrieve specific pieces of video information which meet arbitrary predetermined criteria, such as shape or motion characteristics of video objects embedded within the stored video information, in response to a user-defined query.

In response to this need, there have been several attempts to develop video search and retrieval applications. Existing techniques fall into two distinct categories: query by example ("QBE") and visual sketching.

In the context of image retrieval, examples of QBE systems include QBIC, PhotoBook, VisualSEEk, Virage and FourEyes, some of which are discussed in T. Minka, "An Image Database Browser that Learns from User Interaction," MIT Media Laboratory Perceptual Computing Section, TR #365 (1996). These systems work under the pretext that several satisfactory matches must lie within the database. Under this pretext, the search begins with an element in the database itself, with the user being guided towards the desired image over a succession of query examples. Unfortunately, such "guiding" leads to substantial wasted time as the user must continuously refine the search.

Although space partitioning schemes to precompute hierarchical groupings can speed up the database search, such groupings are static and require recomputation when a new video is inserted into the database. Likewise, although QBE is, in principle, extensible, video shots generally contain a large number of objects, each of which is described by a complex multi-dimensional feature vector. The complexity arises partly due to the problem of describing shape and motion characteristics.

The second category of search and retrieval systems, sketch based query systems, compute the correlation between a user-drawn sketch and the edge map of each of the images in the database in order to locate video information. Sketch based query systems such as the one described in Hirata et al., "Query by Visual Example, Content Based Image Retrieval, Advances in Database Technology—EDBT," 580 Lecture Notes on Computer Science (1992, A. Pirotte et al. eds.), compute the correlation between the sketch and the edge map of each of the images in a database. In A. Del Bimbo et al., "Visual Image Retrieval by Elastic Matching of User Sketches," 19 IEEE Trans. on PAMI, 121–132 (1997), a technique which minimizes an energy functional to achieve a match is described. In C. E. Jacobs, et al., "Fast Miltiresolution Image Querying," Proc. of SIGGRAPH, 277–286, Los Angeles (August 1995), the authors compute a distance between the wavelet signatures of the sketch and each of the images in the database.

Although some attempts have been made to index video shots, none attempt to represent video shots as dynamic collection of video objects. Instead, the prior techniques have utilized image retrieval algorithms for indexing video simply by assuming that a video clip is a collection of image frames.

In particular, the techniques developed by Zhang and Smoliar as well as the ones developed at QBIC use image retrieval methods (such as by using color histograms) for video. A "key-frame" is chosen from each shot, e.g., the r-frame in the QBIC method. In the case of Zhang and Smoliar, the key frame is extracted from a video clip by choosing a single frame from the clip. The clip is chosen by averaging over all the frames in the shot and then choosing the frame in the clip which is closest to the average. By using conventional image searches, such as a color histogram search, the key frames are used to index video.

Likewiese, in the QBIC project, the r-frame is selected by taking an arbitrary frame, such as the first frame, as the representative frame. In case the video clip has motion, the mosaiked representation is used as the representative frame for the shot. QBIC again uses their image retrieval technology on these r-frames in order for them to index video clips.

In order to index video clips, the Informedia project creates a transcript of video by using a speech recognition algorithm on the audio stream. Recognized words are aligned with the video frame where the word was spoken. A user may search video clips by doing a keyword search. However, the speech to text conversion proved to be a major stumbling block as the accuracy of the conversion algorithm was low (around 20–30%), a significant impact on the quality of retrieval.

The above-described prior art devices fail to satisfy the growing need for an effective content based video search engine that is able to search for and retrieve specific pieces of video information which meet arbitrary predetermined criteria. The techniques are either incapable of searching motion video information or search such information only with respect to a global parameter such as panning or zooming. Likewise the prior art techniques fail to describe techniques for retrieving video information based on spatial and temporal characteristics. Thus, the aforementioned existing techniques cannot search for and retrieve specific pieces of video information which meet arbitrary predetermined criteria such as shape or motion characteristics of video objects embedded within the stored video information, in response to a user-defined query.

SUMMARY OF THE INVENTION

An object of the present invention is to provide a truly content based video search engine.

A further object of the present invention is to provide a search engine which is able to search for and retrieve video objects embedded in video information.

Another object of the invention is to provide a mechanism for filtering identified video objects so that only objects which best match a user's search query will be retrieved.

Yet another object of the present invention is to provide a video search engine that is able to search for and retrieve specific pieces of video information which meet arbitrary predetermined criteria in response to a user-defined query.

A still further object of the present invention is to provide a search engine which is able to extract video objects from video information based on integrated feature characteristics of the video objects, including motion, color, and edge information.

In order to meet these and other objects which will become apparent with reference to further disclosure set forth below, the present invention provides a system for permitting a user to search for and retrieve video objects from one or more sequences of frames of video data over an interactive network. The system advantageously contains one or more server computers including storage for one or more databases of video object attributes and storage for one or more sequences of frames of video data to which the video object attributes correspond, a communications network permitting transmission of the one or more sequences of frames of video data from the server computers, and a client computer. The client computer houses a query interface to receive selected video object attribute information, including motion trajectory information; a browser interface receiving the selected video object attribute information and for browsing through stored video object attributes within the server computers by way of the communications network, to determine one or more video objects having attributes which match, within a predetermined threshold, the selected video object attributes; and also an interactive video player receiving one or more transmitted sequences of frames of video data from the server computers which correspond to the determined one or more video objects.

In a preferred arrangement, the databases stored on the server computers include a motion trajectory database, a spatio-temporal database, a shape database, a color database, and a texture database. The one or more sequences of frames of video data may be stored on the server computers in a compressed format such as MPEG-1 or MPEG-2.

The system also may include a mechanism for comparing each selected video object attribute to corresponding stored video object attributes within the server computers, in order to generate lists of candidate video sequences, one for each video object attribute. Likewise, a mechanism for determining one or more video objects having collective attributes which match, within a predetermined threshold, the selected video object attributes based on the candidate lists are beneficially provided. The system also includes a mechanism for matching the spatial and temporal relations amongst multiple objects in the query to a group of video objects project in the video clip.

In accordance with a second aspect of the present invention, a method for extracting video objects from a sequence of frames of video data which include at least one recognizable attribute is provided. The method calls for quantizing a present frame of video data by determining and assigning values to different variations of at least one attribute represented by the video data to generate quantized frame information; performing edge detection on the frame of video data based on the attribute to determine edge points in the frame to thereby generate edge information; receiving one or more segmented regions of video information from a previous frame, and extracting regions of video information sharing the attribute by comparing the received segmented regions to the quantized frame information and the generated edge information.

Preferably, the extracting step consists of performing interframe projection to extract regions in the current frame of video data by projecting one of the received regions onto the current quantized, edge detected frame to temporally track any movement of the region; and performing intraframe segmentation to merge neighboring extracted regions in the current frame under certain conditions. The extracting step may also include labeling all edges in the current frame which remain after intraframe segmentation to neighboring regions, so that each labeled edge defines a boundary of a video object in the current frame.

In a particularly preferred technique, a future frame of video information is also received, the optical flow of the present frame of video information is determined by performing hierarchical block matching between blocks of video information in the current frame and blocks of video information in the future frame; and motion estimation on the extracted regions of video information is performed, by way of determining an affine matrix, based on the optical flow. Extracted regions of video information may be grouped based on size and temporal duration, as well as on affine models of each region.

In yet another aspect of the present invention, a method for locating a video clip which best matches a user-inputted search query from a sequence of frames of video data that include one or more video clips, where the video clip includes a video object temporally moving in a predetermined trajectory, is provided. The method advantageously includes receiving a search query defining at least one video object trajectory; determining the total distance between the received query and at least a portion of one or more pre-defined video object trajectories; and choosing one or more of said defined video object trajectories which have the least total distance from the received query to locate the best matched video clip or clips.

Both the search query and pre-defined video object trajectories may be normalized. The query normalizing step preferably entails mapping the received query to each normalized video clip, and scaling the received mapped query to each video object trajectory defined by the normalized video clips. The determining step is realized either by a spatial distance comparison, or a spatio-temporal distance comparison.

In still another aspect of the present invention, a method for locating a video clip which best matches a user-inputted search query from one or more video clips, where each video clip comprises one or more video objects each having predetermined characteristics, is provided. This method includes receiving a search query defining one or more characteristics for one or more different video objects in a video clip; searching the video clips to locate video objects which match, to a predetermined threshold, at least one of said defined characteristics; determining, from the located video objects, the video clips which contain the one or more different video objects; and determining a best matched video clip from the determined video clips by calculating the distance between the one or more video objects defined by the search query, and the located video objects. The characteristics may include color, texture, motion, size or shape.

In a highly preferred arrangement, the video clips include associated text information and the search query further includes a definition of text characteristics corresponding to the one or more different video objects, and the method further includes the step of searching the associated text information to locate text which matches the text characteristics. Then, the best matched video clip is determined from the determined video clips and the located text.

The accompanying drawings, which are incorporated and constitute part of this disclosure, illustrate a preferred embodiment of the invention and serve to explain the principles of the invention.

BRIEF DESCRIPTION OF THE DRAWINGS

Exemplary embodiments of the present invention will now be described in detail with reference in the accompanying drawings in which.

DETAILED DESCRIPTION

Figure 1:
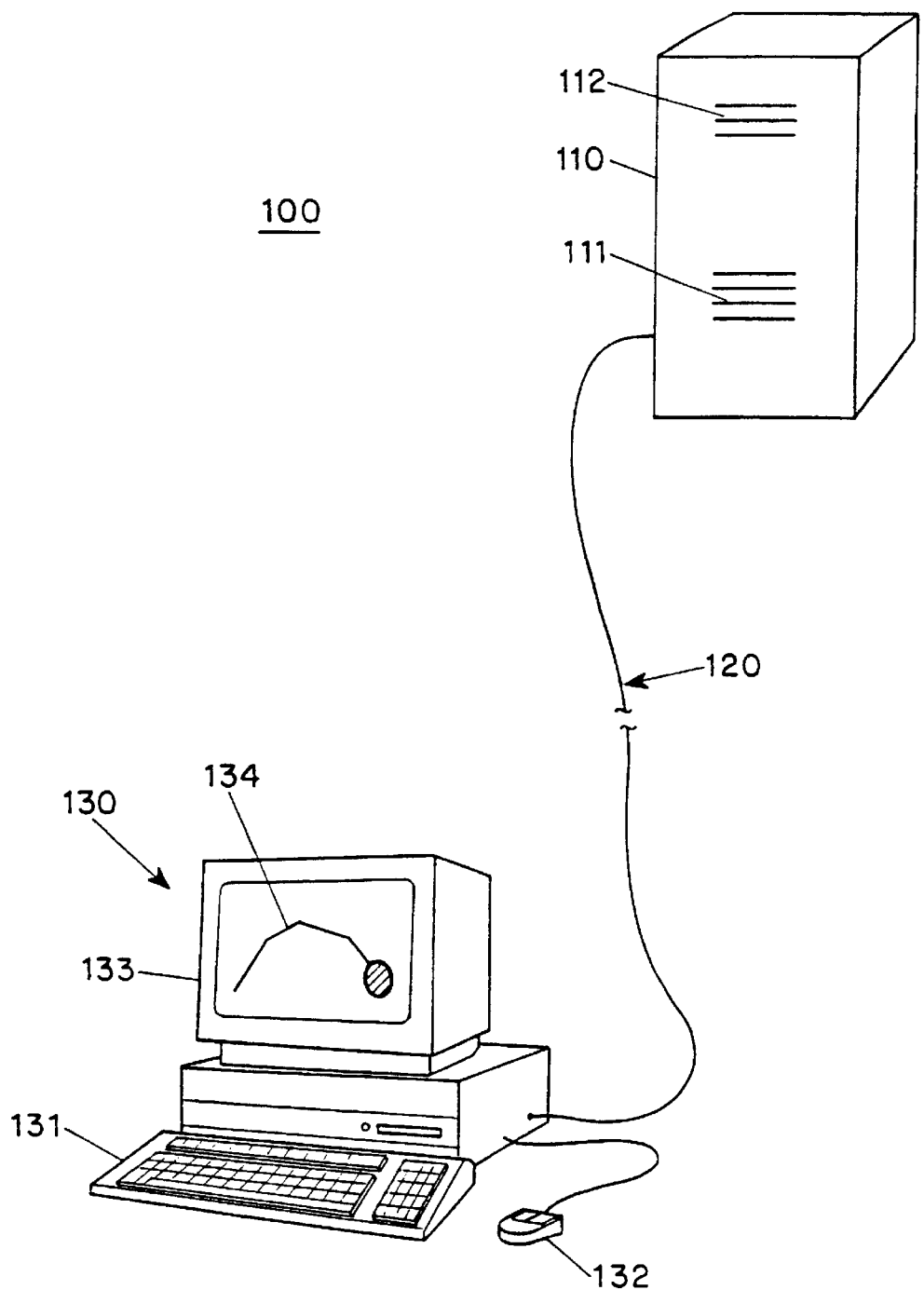
FIG. 1 is a diagram of a system for searching for and retrieving video information in accordance with one aspect of the present invention.

Referring to FIG. 1, an exemplary embodiment of a system for searching for and retrieving specific pieces of video information which meet arbitrary predetermined criteria such as shape or motion characteristics of video objects embedded within the stored video information, in response to a user-defined query, is provided. The architecture of the system 100 is broadly arranged into three components, server computer 110, communications network 120, and client computer 130.

The server computer 110 includes a database 111 storing metadata for video objects and visual features, as well as a storage subsystem 112 storing the original audiovisual information and any associated textual information that are associated with the extracted video objects and visual features. The communications network 120 may be based on the Internet or a broadband network. Thus, although shown in FIG. 1 as one computer, the server computer 110 may be a plurality of computers scattered about the world wide web, all able to communicate to the client computer 130 via the communications network 120.

The client computer 130 includes a keyboard 131, mouse 132, and monitor 133 which together form both a query interface and a browser interface that permit a user to enter search queries into computer 130 and browse the network 100 for audiovisual information. Although not shown in FIG. 1., other query input devices such as light pens and touch screens may also be readily incorporated into client computer 130. The monitor 133 is used to display visual information retrieved from server computer 110 via the network 120, as well as to illustrate search queries entered by a user of computer 110. Since such information is preferably retrieved in a compressed format, e.g., as an MPEG-2 bitstream, the computer 130 includes appropriate commercially available hardware or software, e.g., an MPEG-2 decoder, to decompress the retrieved information into a displayable format.

Figure 2:
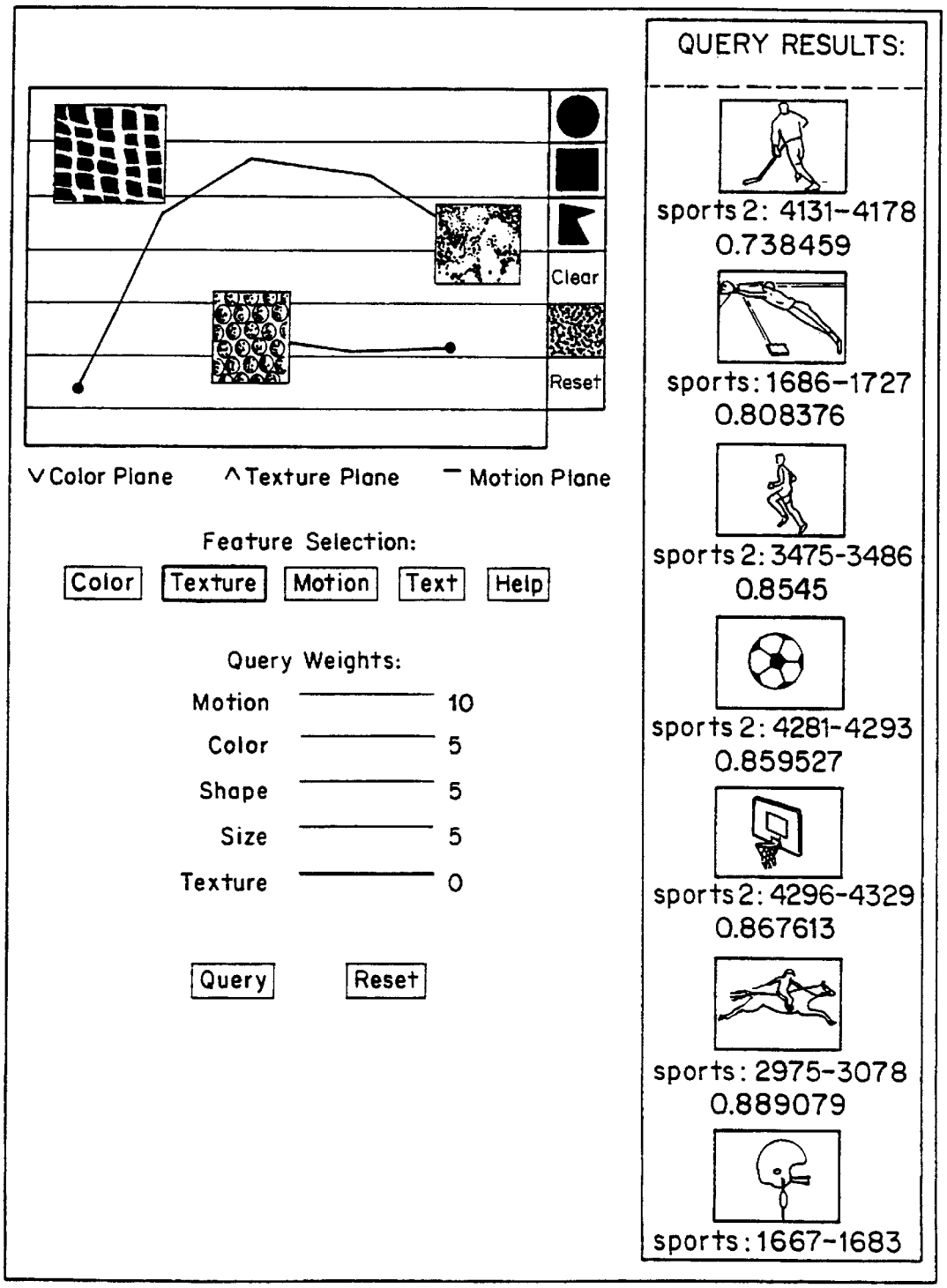
FIG. 2 is an illustrative drawing of a query interface useful in the system of FIG. 1.

Using the keyboard 131, mouse 132, etc., a user can enter a search query on computer 130 that specifies one or more searchable attributes of one or more video objects that are embedded in clip of video information. Thus, for example, if a user wishes to search for a video clip which includes a baseball that has traveled in a certain trajectory, the user may sketch the motion 134 of the object to be included in the query, and select additional searchable attributes such as size, shape, color, and texture. An exemplary query interface is depicted in FIG. 2.

As used herein, a "video clip" shall refer to a sequence of frames of video information having one or more video objects having identifiable attributes, such as, by way of example and not of limitation, a baseball player swinging a bat, a surfboard moving across the ocean, or a horse running across a prairie. A "video object" is a contiguous set of pixels that is homogeneous in one or more features of interest, e.g., texture, color, motion and shape. Thus, a video object is formed by one or more video regions which exhibit consistency in at least one feature. For example a shot of a person (the person is the "object" here) walking would be segmented into a collection of adjoining regions differing in criteria such as shape, color and texture, but all the regions may exhibit consistency in their motion attribute.

Figure 3:
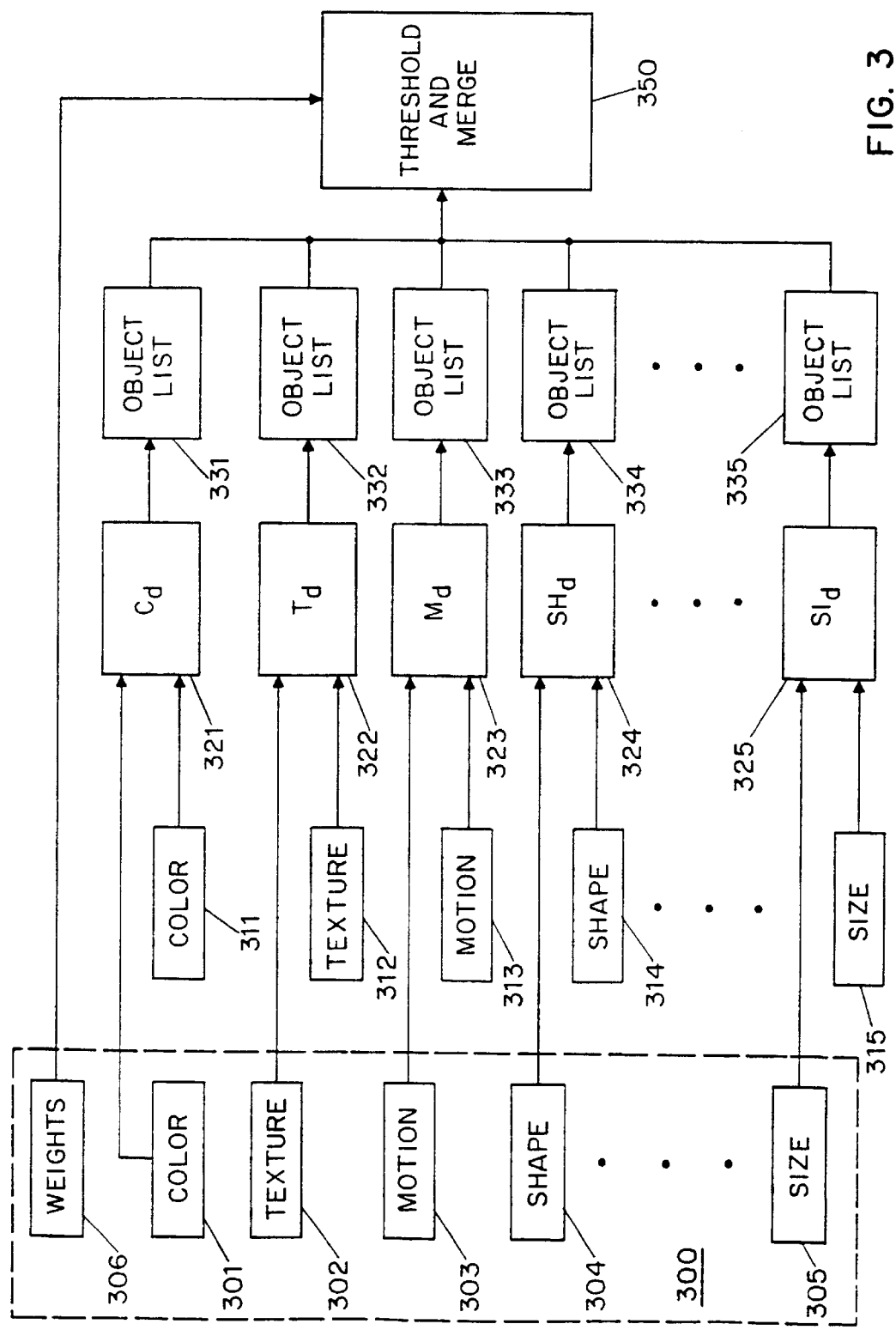
FIG. 3 is an illustrative drawing of a video object searching method performed in the system of FIG. 1.

With reference to FIG. 3, the search query 300 may include the color 301, texture 302, motion 303, shape 304, size 305 and other attributes such as global parameters like pan and zoom of the desired video objects. Various weights indicative of the relative importance of each attribute may also be incorporated into the search query 306. Upon receiving the search query, the browser in computer 130 will search for similar attributes stored in the databases 111 of server computer 110 via the network 120. The server 110 contains several feature databases, one for each of the individual features that the system indexes on, e.g., color database 311, texture database 312, motion database 313, shape database 314, and size database 315. Each database is associated with original video information that is stored as a compressed MPEG bitstream in storage 112. Of course, other compression formats or compression data may be used.

In the server, each queried attribute is compared to stored attributes, a detailed description of which will follow. Thus, the queried color 301 will be matched 321 against the color database 311; matching of texture 322, motion 323, shape 324, size 325 and any other attribute is likewise. Lists of candidate video shots are generated for each object specified in the query, e.g., color object list 331, texture object list 332, motion object list 333, shape object list 334 and size object list 335. In the server computer 110, each list may be merged with a preselected rank threshold or a feature distance threshold, so that only the most likely candidate shots survive.

Next, at a predetermined minimum threshold, the candidate lists for each object are merged 350 to form a single video shot list. The merging process entails a comparison of each of the generated candidate lists 331, 332, 333, 334, 335, so that video objects which do not appear on all candidate lists are screened out. The candidate video objects which remain after this screening are then sorted based on their relative global weighted distances from the queried attributes. Finally, a global threshold based on predetermined individual thresholds and preferably modified by the user-defied weights entered at the query 306 are used to prune the object list to the best matched candidate or candidates. Our preferred global threshold is 0.4.

For each of these video shots in the merged list, keyframes are dynamically extracted from the video shot database and returned to the client 130 over the network 120. If the user is satisfied with the results, the video shot corresponding to the key frame may be extracted in real time from the video database by "cutting" out that video shot from the database. The video shots are extracted from the video database using video editing schemes in the compressed domain, such as the techniques described in Chang et al., PCT Patent Appn. No. PCT/US97/08266, filed on May 16, 1997, the disclosure of which is incorporated by reference herein.

Those skilled in the art will appreciate that the matching technique of FIG. 3 can be performed at the object level or at the region level.

The various techniques used in the system described herein in connection with FIG. 1 will now be described. In order to produce meaningful search queries, the client computer 130 may limit or quantize the attribute to be searched. Thus, with respect to color, the set of allowable colors could be uniformly quantizing the HSV color space, although use of true color, which of course is already quantized in that certain colors are allowable in modem computers, is preferable.

With respect to texture, the well know MIT texture database can be used for assigning the textural attributes to the various objects. Thus, a user must select from the 56 available textures in the database to form a search query. Of course, other texture sets may be readily used.

The shape of the video object can be an arbitrary polygon along with ovals of arbitrary shape and size. The user may thus sketch out an arbitrary polygon with the help of the cursor, and other well known shapes such as circles, ellipses and rectangles may be pre-defined and are easily inserted and manipulated. The query interface will translate the shape into a set of numbers that accurately represent the shape. For example, a circle is represented by a center point and a radius; an ellipse by two focus points and a distance.

With respect to motion, two alternative modes may be employed. First, a search may be based on the perceived motion of the video objects, as derived from the optical flow of pixels within the video objects. Optical flow is the combined effect of both global motion (i.e., camera motion) and local motion (i.e., object motion). For example, if the camera is tracking the motion of a car, the car appears to be static in the video sequence.

Second, a search may be based on the "true" motion of the video object. The true motion refers to the local motion of the object, after the global motion is compensated. In the of a moving car, the true motion of the car is the actual physical motion of the of car driving.

The global motion of the dominant background scene may be estimated using the well known 6-parameter affine model, while a hierarchical pixel-domain motion estimation method is used to extract optical flow. The affine model of the global motion is used to compensate the global motion component of all objects in the same scene. The following is the 6-parameter model.

$$dx = a_0 \quad (1)$$

$$dy = a_3 \quad (2)$$

where $a_i$ are the affine parameters, x, y are the coordinates, and dx, dy are the displacement or optical flow at each pixel.

Classification of global camera motion, e.g., zoom, pan, or tilt, is based on the global affine estimation. For the detection of panning, the histogram of the global motion velocity field should be computed in eight-directions, as those skilled in the art will appreciate. If there exists one direction with dominant number of moving pixels, a camera panning in that direction is declared. Camera zooming is detected by examining the average magnitude of the global motion velocity field and two scaling parameters ($a_1$ and $a_5$) in the above affine model. When there are sufficient motion (i.e. the average magnitude is above a given threshold), and $a_1$ and $a_5$ are both positive and above a certain threshold, camera zooming in is declared. Otherwise if $a_1$ and $a_5$ are both negative and under a certain value, camera zooming out is declared. Such information may be included in a search query to indicate the presence or absence of camera panning or zooming.

A search may also include temporal information relating to one or more video objects. Such information may define the overall duration of the object either in relative terms, i.e., long or short, or in absolute terms, i.e., in seconds. In the case of multiple object queries, the user may given the flexibility of specifying the overall scene temporal order by specifying the "arrival" order of the various objects in the scene and/or the death order, i.e., the order in which video objects disappear from the video clip. Another useful attribute related to time is the scaling factor, or the rate at which the size of the object changes over the duration of the objects existence. Likewise, acceleration may be a suitable attribute for searching.

Prior to forming the actual query for the browser to search, the various attributes may be weighted in order to reflect their relative importance in the query. The feature weighting may be global to the entire animated sketch; for example, the attribute color may have the same weight across all objects. The final ranking of the video shots that are returned by the system is affected by the weights that the user has assigned to various attributes.

Figure 4:
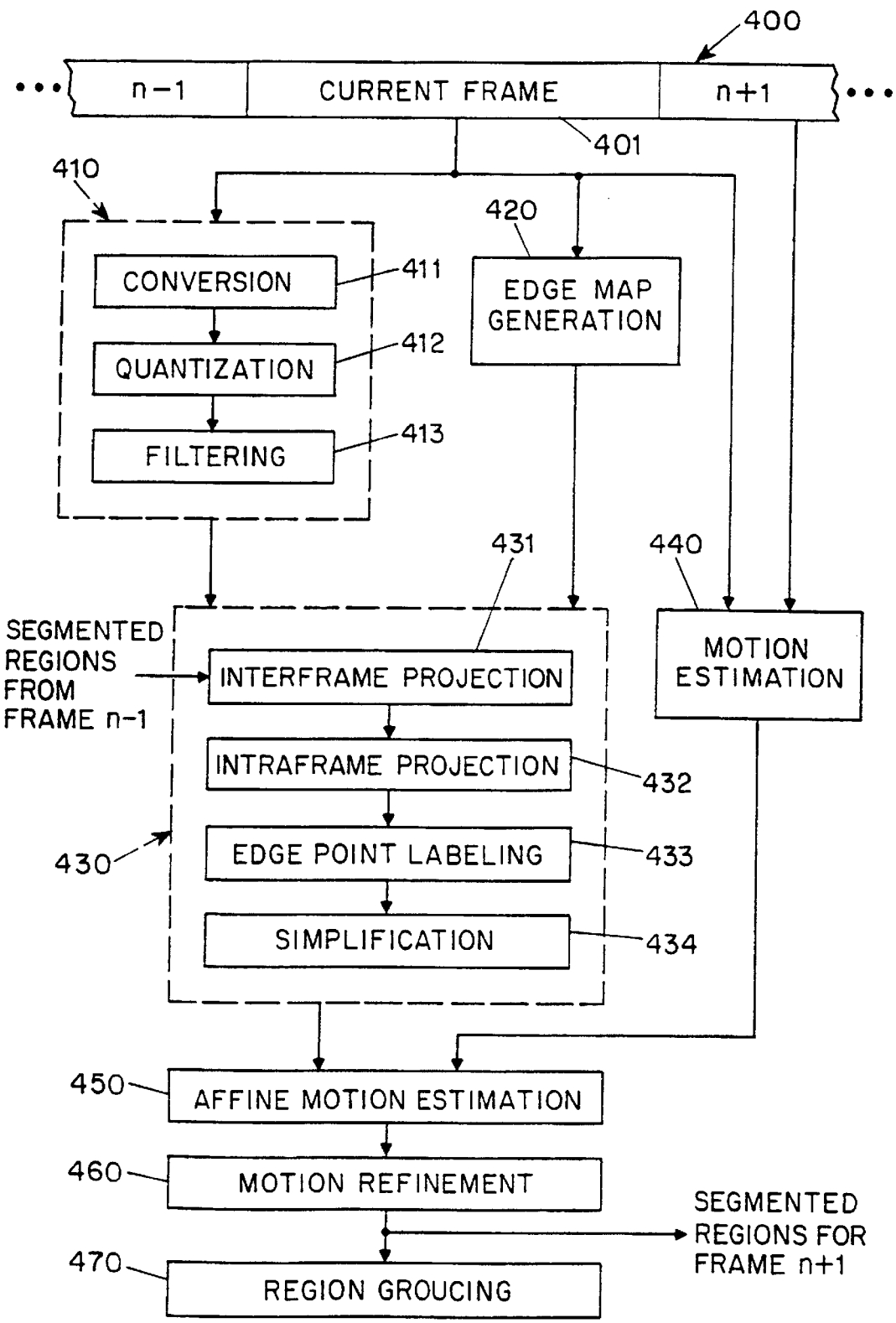
FIG. 4 is a flowchart of a method for extracting video objects from a sequence of frames of video information in accordance with one aspect of the present invention.

Referring to FIG. 4, a technique for extracting video objects from a video clip will now be described. A video clip formed by a sequence of frames of compressed video information 400, including a current frame n 401, is illustratively analyzed in FIG. 4.

Prior to any video object extraction, raw video is preferably split up into video clips such as video clip 400. Video clip separation may be achieved by scene change detection algorithms such as the ones described in the aforementioned Chang et al. PCT Patent Appn. No. PCT/US97/08266. Chang et al. describes techniques for detecting both abrupt and transitional (e.g. dissolve, fade in/out, wipe) scene changes in compressed MPEG-1 or MPEG-2 bitstreams using the motion vectors and Discrete Cosine Transform coefficients from the MPEG bitstream to compute statistical measures. These measurements are then used to verify the heuristic models of abrupt or transitional scene changes.

In order to segment and track video objects, the concept of an "image region" is utilized. An image region is a contiguous region of pixels with consistent features such as color, texture, or motion, that generally will correspond to part of a physical object, like a car, a person, or a house. A video object consists of a sequence of instances of the tracked image region in consecutive frames.

The technique illustrated in FIG. 4. segments and tracks video objects by considering static attributes, edge and motion information in the video shot. The current frame n 401 is preferably used in both a projection and segmentation technique 430 and a motion estimation technique 440 to be described.

Prior to projection and segmentation, the information is pre-processed in two different ways in order to achieve consistent results. In parallel, the current frame n is both quantized 410 and used to generate an edge map 420, based on one or more recognizable attributes for the information. In our preferred implementation as described below, color is chosen as that attribute because of its consistency under varying conditions. However, other attributes of the information, such as texture, could likewise form the basis for the projection and segmentation process as those skilled in the art will appreciate.

As illustrated in FIG. 4., the current frame (i.e. frame n) is converted 411 in a perceptually uniform color space, e.g., CIE L*u*v* space. Non-uniform color spaces such as RGB are not suitable for color segmentation as distance measure in these spaces is not proportional to perceptual difference. CIE L*u*v* color space divides color into one luminance channel and two chrominance channels, permitting variation in the weight given to luminance and chrominance. This is a very important option that permits users the ability assign differing weights in accordance with the characteristics of given video shots. Indeed, it is generally better to assign more weight to the chrominance channels, e.g. two times more.

The L*u*v* color space converted information is then adaptively quantized 412. Preferably, a clustering based quantization technique, such as the well known K-Means or Self Organization Map clustering algorithms, is used to produce quantization palettes from actual video data in the L*u*v* space. More common fixed-level quantization techniques can also be used.

After adaptive quantization 412, non-linear median filtering 413 is preferably used to eliminate insignificant details and outliers in the image while preserving edge information. Quantization and median filtering thus simplify images by removing possible noise as well as tiny details.

Simultaneously with quantization 410, an edge map of frame n is generated 420 using an edge detection algorithm. The edge map is a binary mask where edge pixels are set to 1 and non-edge-pixels are set to 0. It is generated through the well-known Canny edge detection algorithm, which performs 2-D Gaussian pre-smoothing on the image and then takes directional derivatives in the horizontal and vertical directions. The derivatives, in turn, are used to calculate a gradient, local gradient maxima being taken as candidate edge pixels. This output is run through a two-level thresholding synthesis process to produce the final edge map. A simple algorithm may be utilized to automatically choose the two threshold levels in the synthesis process based on the histogram of the gradient.

Both the quantized attribute information and the edge map are utilized in the projection and segmentation step 430, where regions having a consistent attribute, e.g., color, are fused. Projection and segmentation preferably consists of four sub steps, including interframe projection 431, intraframe projection 432, edge point labeling 432 and simplification 433.

Figure 5:
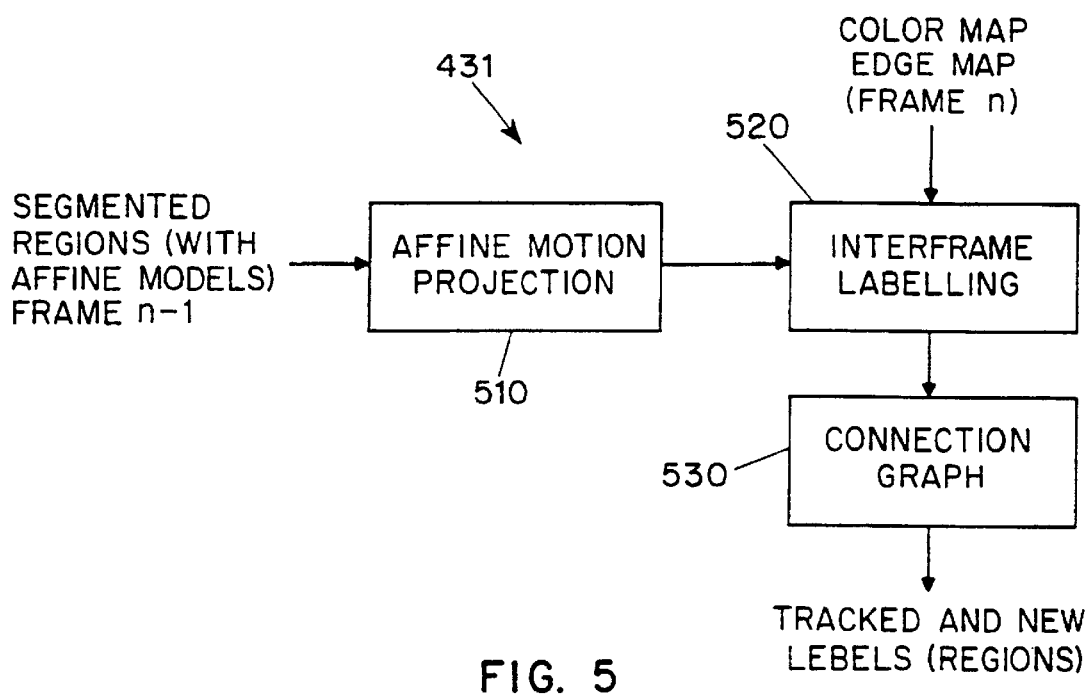
FIG. 5. is a flowchart of a preferred method for region projection and interframe labeling useful in the method shown in FIG. 4.

The inter-fame projection step 431 projects and tracks previously segmented regions determined from the previous frame, i.e. frame n−1 in FIG. 4. Referring to FIG. 5, in the affine projection step 510, existing regions from frame n−1 are firstly projected into frame n according to their affine parameters, to be discussed below. If the current frame is the first frame in the sequence, this step is simply skipped. Next a modified pixel labeling process 520 is applied. For every non-edge pixel in frame n, if it is covered by a projected region and the weighted Euclidean distance, where WL=1, Wu=2, and Wv=2 are default weights, between the color of the pixel and the mean color of the region is under a given threshold, e.g., 256, the pixel is labeled consistent with the old region. If the pixel is covered by more than one projected regions under the given threshold, it is labeled as the region with the nearest distance. If, however, no region satisfies the condition, a new label is assigned to the pixel. Notice that edge pixels are not processed and thus are not labeled at this time. Finally, a connection graph 530 is built among all labels, i.e. regions: two regions are linked as neighbors if pixels in one region has neighboring pixels (4-connection mode) in another region.

Figure 6:
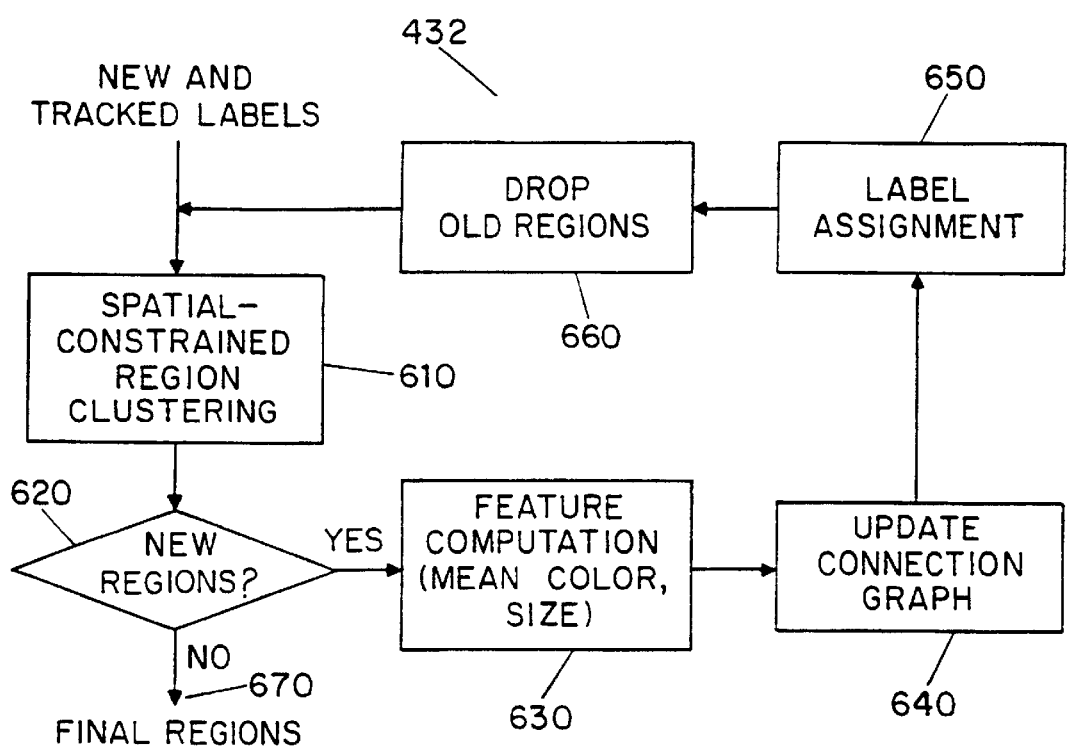
FIG. 6. is a flowchart of a preferred method for intraframe region merging useful in the method shown in FIG. 4.

In the intraframe projection step 432, the above tracked and new labels (regions) are merged into larger regions. Referring to FIG. 6, an iterative spatial-constrained clustering algorithm 610 is utilized, where two adjoining regions with a color distance smaller than a given threshold, preferably 225, are merged into one new region 620 until color distances between any two adjoining regions are larger than the threshold. If a new region is generated from two adjoining regions, its mean color is computed 630 by taking weighted average of the mean colors of the two old regions, where sizes of the two old regions are used as weights. The region connections are then updated 640 for all neighbors of the two old regions. The new region is then assigned one label 650 from the labels of the two old regions: if both old labels are tracked from the previous frame, then choose the label of the larger region; if one old label is tracked and another one is not, then choose the tracked label; otherwise choose the label of the larger region. The two old regions are dropped 660, and the process is repeated until no new regions are determined 670.

Returning to FIG. 4, edge points may be assigned 433 to their neighboring region according to color measure to ensure the accuracy of region boundaries. In both the interframe and intraframe segmentation processes discussed above, only non-edge pixels are processed and labeled. Edge pixels are not merged into any regions. This ensures that regions clearly separated by long edges will not be spatially connected and thus will not be merged with each other. After the labeling of all non-edge pixels, edge pixels are assigned to their neighboring regions according to the same color distance measure. The above-mentioned connection graph may be updated during the labeling process.

Finally, a simplification process 434 is applied to eliminate small regions, i.e. regions with less than a given number of pixels. The threshold parameter depends on the frame size of images. For QCIF size (176×120) images, the preferable default value is 50. If a small region is close to one of its neighboring regions, i.e. the color distance is below the color threshold, the small region is merged with the neighboring region. Otherwise the small region is dropped.

Concurrently with the projection and segmentation process 430, the optical flow of current frame n is derived from frame n and n+1 in the motion estimation step 440 using a hierarchical block matching method, such as the technique described in M. Bierling, "Displacement Estimation by Hierarchical Block Matching," 1001 *SPIE Visual Comm. & Immage Processing* (1988), the disclosure of which is incorporated by reference herein. Unlike ordinary block matching techniques where a minimum mean absolute luminance difference is only searched by using a fixed measurement window size, this method uses distinct sizes of measurement windows at different levels of a hierarchy to estimate the dense displacement vector field (optical flow). It yields relatively reliable and homogeneous result. Utilizing a 3-level hierarchy is preferable.

After color or other attribute regions have been extracted and a measure of the optical flow in the frame generated, a standard linear regression algorithm is used to estimate the affine motion for each region 450. For each region, linear regression is used to determine the affine motion equation, i.e. the 6 parameters in the equation, that most nearly fits the dense motion field inside the region.

Affine motion parameters are preferably further refined 460 using a 3-step region matching method in the six-dimensional affine space, which is an extension of the common 3-step block matching technique used in estimation/MPEG compression. A description of this well know technique can be found in Arun N.Netravali et al., "Digital Pictures: Representation, Compression and Standards, Second Edition" pp. 340–344 (Plenum Press, New York and London, 1995), which is incorporated by reference herein. For each region, the initial affine model is used to search for a new model which projects the region with the minimum mean absolute luminance error. The search along each dimension is defined as 10% of the initial parameter on that dimension.

Through affine motion estimation 450 and refinement 460, homogeneous color regions with affine motion parameters are generated for frame n. Similarly, these regions will be tracked in the segmentation process of frame n+1.

Finally, region grouping 470 may be applied at the final stage in the process to avoid over-segmentation and obtain higher-level video objects. Several criteria may be adopted to group or identify major interesting regions.

First, the size, i.e., the average number of pixels, and duration, i.e., the number of successive frames that a region is tracked, of the determined regions can be utilized to eliminate noisy and unimportant regions. Regions with both small size and/or small duration could be dropped.

Second, adjoining regions with similar motion may be grouped into one moving object. This is applied to video sequences with moving objects in order to detect those objects. In order to realize such grouping, a spatial-constrained clustering process may be used to group adjoining regions based on their affine motion parameters at individual frames. Next, a temporal searching process may be used to link region groups at different frames together as one video object if these region groups contain at least one common region. For each region group at the starting frame, such a search begins with the region with the longest duration inside the group. If a region group is successfully tracked in more than a certain amount of time, e.g., ⅓ of a second, a new object label is assigned to this region group. Finally, a temporal alignment process may be applied to ensure the consistence of regions contained in a video object. If a region only exists shortly, e.g., for less than 10% of the duration of the video object itself, it should be considered as an error of the region grouping process and is dropped from the video object.

As discussed above in connection with FIG. 3, the server computer 110 contains a plurality of feature databases, e.g., a color database 311, texture database 312, motion database 313, shape database 314, and size database 315, where each database is associated with original video information. For each video object extracted from the parsed video clips, e.g., video objects extracted by the method explained with reference to FIG. 4, attendant features are advantageously stored in the databases of server computer 110.

For the color database 311, a representative color for the video object is quantized CIE-LUV space. Quantization is not a static process, with the quantization palette changing with each video shot, depending on color variation. Although our preferred arrangement utilizes a representative color, the color database may also include a single color, an average color, a color histogram, and/or color pairs for the video object.

With respect to the texture database 312, three so-called Tamura texture measures, i.e, coarseness, contrast and orientation, are computed as a measure of the textural content of the object. Alternatively, wavelet-domain textures, texture histograms, and/or Laws Filter-based textures may be utilized to develop database 312.

For the motion database 313, the motion of each video object is stored as a list of N−1 vectors, where the number of frames in the video clip is N. Each vector is the average translation of the centroid of the object between successive frames after global motion compensation. Along with this information, we also store the frame rate of the video shot sequence hence establishing both the "speed" of the object and its duration.

For the shape database 314, the principal components of the shape of each video object are determined by a well understood eigenvalue analysis, such as that described in E. Saber et al, "Region-based affine shape matching for automatic image annotation and query-by-example," 8 Visual Comm. and Image Representation 3–20 (1997). At the same time, the first and second order moments of the region are generated. Two other new features, the normalized area and the percentage area, are also calculated. The normalized area is the area of the object divided by the area of a circumscribed circle. If the region can be fairly approximated by an circle, such approximation is then made. For example, if the axis ratios of the object is greater than 0.9 and the normalized area is also greater than 0.9 then the shape is classified as a circle. Alternatively, geometric invariants, moments of different orders in each dimension, polynomial approximation, spline approximation, and/or algebraic invariants could be utilized.

Finally, for the size database 315, a size in terms of pixels is stored.

The evaluation of spatial relationship over time could be indexed as a succession of edits or the original spacing graph. Other databases, such as spatial-temporal databases could be used, when the spacial relationship amongst the objects in a frame is indexed by a spacial graph or by 2-D strip.

Next, the techniques for comparing a search query to the information stored in the feature databases 111 of server computer 110 will be described. As discussed with reference to FIG. 3, server 110 performs the task of matching 321, 322, 323, 324, 325 the queried color 301, texture 322, motion 323, shape 324, size 325 and other attributes against the information stored in databases 311, 312, 313, 314, and 315, etc. to generate lists of candidate video shots 331, 332, 333, 334, 335.

With respect to matching motion trajectories 323, the three dimensional trajectory of a video object is optimally utilized. It is represented by a sequence $\{x[i], y[i]$ where $i=1, N\}$, the three dimensions comprising of the two spatial dimensions x,y and a temporal dimension t that are normalized to the frame number. The frame rate provides true time information.

At the client computer 130, a user may sketch out an object trajectory as a sequence of vertices in the x-y plane, and also specify the duration of the object in a video clip. The duration is quantized, in terms of the frame rate, into three levels: long, medium and short. The entire trajectory may be readily computed by uniformly sampling the motion trajectory based on the frame rate, e.g., 30 frames per second.

In accordance with a preferred aspect of our invention, two major modes of matching trails, a spatial mode and a spatio-temporal mode, are now described. In the spatial mode, the motion trails are projected onto the x-y plane, resulting in an ordered contour. By measuring the distances between the query contour and the corresponding contour for each object in the database, candidate trajectories are determined. This kind of matching provides "time-scale invariance" and is useful when the user is unsure of the time taken by an object to execute the trajectory.

In the spatio-temporal mode, the entire motion trail is used to compute distance in accordance with the following metric:

$$\Sigma_i((x_q[i]-x_t[i])^2+(y_q[i]-y_t[i])^2) \quad (3)$$

where, the subscripts q and t refer to the query and the target trajectories respectively and the index i runs over the frame numbers. Alternatively, the index could run over the set of subsamples.

Since in general, the duration of the query object will differ from that of the objects in the database, there are some further refinements that may be beneficial. First, when the durations differ, the two trajectories may be matched only during the shorter of the two durations, i.e the index i will runs up through the minimum of the query duration and the database duration.

Alternatively, the query and the stored trajectory durations may each be normalized to a canonical duration prior to performing matching. For example, if each video clip is normalized so that the playback frame rate is time scaled to a predetermined time scale, the search query should be normalized to the same predetermined time scale by mapping the query the video clip and then scaling the mapped query to the video object trajectory defined by the normalized video clip.

As is the case with motion, the task of matching queried color 201, texture 222, shape 224, size 225 and other attributes against the information stored in databases involves an optimized comparison process. For color, the color of the query object is matched with the mean color of a candidate tracked object in the database in accordance with eq. 4:

$$C_d = \sqrt{(L_q - L_t)^2 + 4(U_q - U_t)^2 + 4(V_q - V_t)^2}, \quad (4)$$

where, Cd is the weighted Euclidean color distance in the CIE-LUV space, and the subscripts q and t refer to the query and the target respectively.

For texture, the three Tamura texture parameters for each tracked object are compared to stored parameters in the database 322. The distance metric is the Euclidean distance weighted along each texture feature with the variances along each channel, as shown in equation 5:

$$T_d = \sqrt{\frac{(\alpha_q - \alpha_t)^2}{\sigma_\alpha^2} + \frac{(\beta_a - \beta_t)^2}{\sigma_\beta^2} + \frac{(\Phi_q - \Phi_t)^2}{\sigma_\Phi^2}} \quad (5)$$

where, α, β, and φ refer to the coarseness, contrast and the orientation respectively and the various σ (α, β, φ) refer to the variances in the corresponding features.

For shape, the metric may simply involve only the principal components of the shape, as shown in equation 6:

$$Sh_d = \left| \frac{\lambda 2_q}{\lambda 1_q} - \frac{\lambda 2_e}{\lambda 2_t} \right| \quad (6)$$

where, and are the eigenvalues along the principal axes of the object, i.e., their ratio is the aspect ratio. Other more complex algorithms such as geometric invariance may be used.

Size is implemented as a distance to area ratio as shown in equation 7:

$$Si_d = 1 - \frac{\min(A_q, A_t)}{\max(A_q, A_t)}, \quad (7)$$

where, Aq, t refer to the percentage areas of the query and target, respectively.

The total distance is simply the weighted sum of these distances, after the dynamic range of each metric has been normalized to lie in [0,1], pursuant to equation 8:

$$D_g = \sum_{i \in features} w_i D_1, \quad (8)$$

Figure 7:
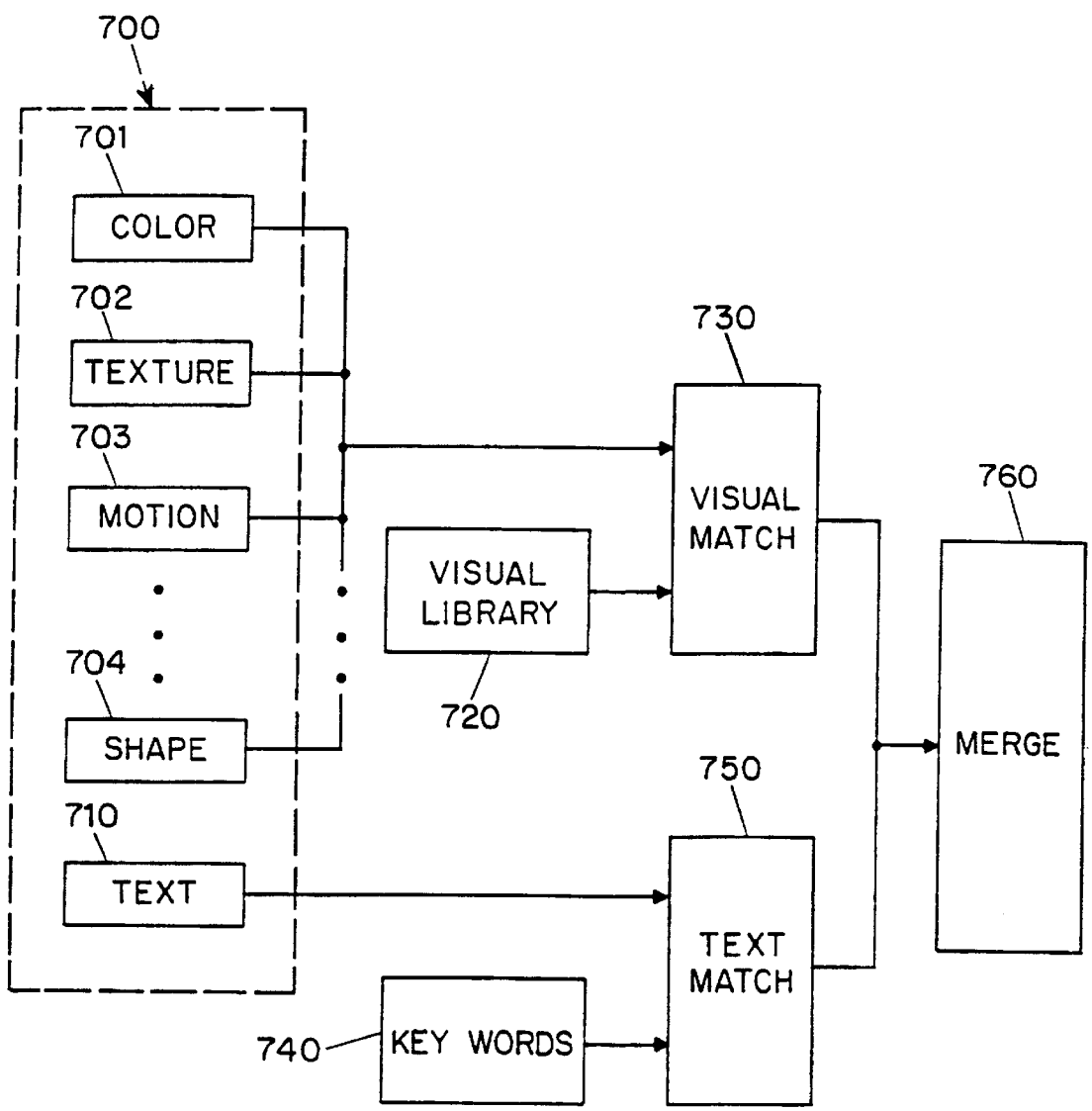
FIG. 7 is an illustrative drawing of an alternative video object searching method performed in the system of FIG. 1.

Referring to FIG. 7, a combined video and text based searching technique to locate video clips based on both embedded video object information and associated audio or text information is now described. This technique simultaneously makes use of visual content such as the motion of objects, attributes like color and texture, as well as the descriptive power of natural languages.

When entering a search query 700, in addition to entering one or more visual attributes such as color 701, texture 702, motion 703, and shape 704, the user is permitted to enter a string of text information 710. The information may be input directly through keyboard 131, through a microphone in connection with commercially available voice recognition software, or through any other human to computer interfacing technique.

The visual information will be matched 730 against the stored library 720 of visual attribute information as discussed in connection with FIG. 3 to generate best matched video clips to a predetermined threshold. However, the architecture of FIG. 7 expands on FIG. 3 by performing a text match 750 with extracted key words 740 that are associated with the same video clips that were used to generate the visual library 720. The result of the text match 750 is one or more best matched video clips based on text alone. Finally, the results of the visual match 730 and the text match 750 are combined 760 to determine, with a high degree of accuracy, the video clip sought by the original search query 700.

In the case of MPEG compressed audiovisual information, the library of extracted key words 740 may be manually annotated, or may be formed by first extracting audio information from the compressed bitstream to transcribe the audio, and then reducing the volume of the transcribed text by a keyword spotting technique.

The above description is merely illustrative of principles involved in the invention. Other modifications of the invention will be obvious to those skilled in the art, and it is intended that the scope of the invention be limited only as set forth in the appended claims.

What is claimed is:

1. A method for extracting video objects from a video clip which includes at least one recognizable attribute, comprising the steps of:

a. quantizing a present frame of video data therein by determining and assigning values to different variations of said at least one attribute represented by said video data to thereby generate quantized frame information;

b. performing edge detection on said frame of video data based on said at least one attribute to determine edge points in said frame to thereby generate edge information;

c. receiving information defining one or more segmented regions from a previous frame, and d. extracting regions of video information from said present frame which share said at least one attribute by comparing said received segmented regions to said quantized frame information and said generated edge information.

2. The method of claim 1, wherein said attribute is color, and quantizing step comprises converting said current frame into uniform color space information, adaptively quantizing said color space information into palettes, and filtering said palettes to remove noise therefrom.

3. The method of claim 2, wherein said adaptive quantizing step comprises quantization with a clustering algorithm.

4. The method of claim 1, wherein said edge detection step comprises applying Canny edge detection to said current frame to generate said edge information as an edge map.

5. The method of claim 1, wherein said extracting step comprises:

a. performing interframe projection to extract regions in the current frame of video data by projecting one of the received regions onto the current quantized, edge detected frame to temporally track any movement of the region; and b. performing intraframe segmentation to merge neighboring extracted regions in the current frame.

6. The method of claim 5, wherein said attribute is color, and wherein said interframe projection step comprises the steps of:

a. projecting said received regions from said previous into said current frame to temporally track regions;

b. labelling each non-edge pixel in said current frame consistent with said received regions or as new a new region; and c. generating a connection graph from said labels to link neighboring regions.

7. The method of claim 6, wherein said intraframe segmentation step comprises the steps of:

a. merging all adjoining regions having a color distance smaller than a predetermined threshold into a new region;

b. determining a mean color for said new region;

c. updating said connection graph;

d. assigning said new region a new label from labels previously assigned to said merged regions; and e. dropping said merged regions.

8. The method of claim 5, wherein said extracting step further comprises the step of labeling all edges in the current frame which remain after intraframe segmentation to neighboring regions, so that each labeled edge defines a boundary of a video object in the current frame.

9. The method of claim 8, wherein said extracting step further comprises the step of simplifying said extracted regions by eliminating any regions having a size below a predetermined threshold.

10. The method of claim 1, further comprising the steps of:

e. receiving a future frame of video information;

f. determining the optical flow of said present frame of video information by performing hierarchical block matching between blocks of video information in said current frame and blocks of video information in said future frame; and g. performing motion estimation on said extracted regions of video information based on said optical flow.

* * * * *

UNITED STATES PATENT AND TRADEMARK OFFICE
CERTIFICATE OF CORRECTION

PATENT NO. : 6,741,655 B1
APPLICATION NO. : 09/423409
DATED : May 25, 2004
INVENTOR(S) : Shih-Fu Chang et al.

It is certified that error appears in the above-identified patent and that said Letters Patent is hereby corrected as shown below:

In the Specifications:

Column 1, line 11, please insert the following header and paragraph:

--STATEMENT REGARDING FEDERALLY SPONSORED RESEARCH OR DEVELOPMENT
This invention was made with government support under grant number 8811111 awarded by the National Science Foundation. The government has certain rights in the invention.--

Signed and Sealed this
Fourteenth Day of May, 2013

Teresa Stanek Rea
*Acting Director of the United States Patent and Trademark Office*